Sept. 13, 1960  H. S. ZABLOCKI  2,952,819
CONTROL DEVICE FOR INDUCTION HEATING
Filed Nov. 30, 1956
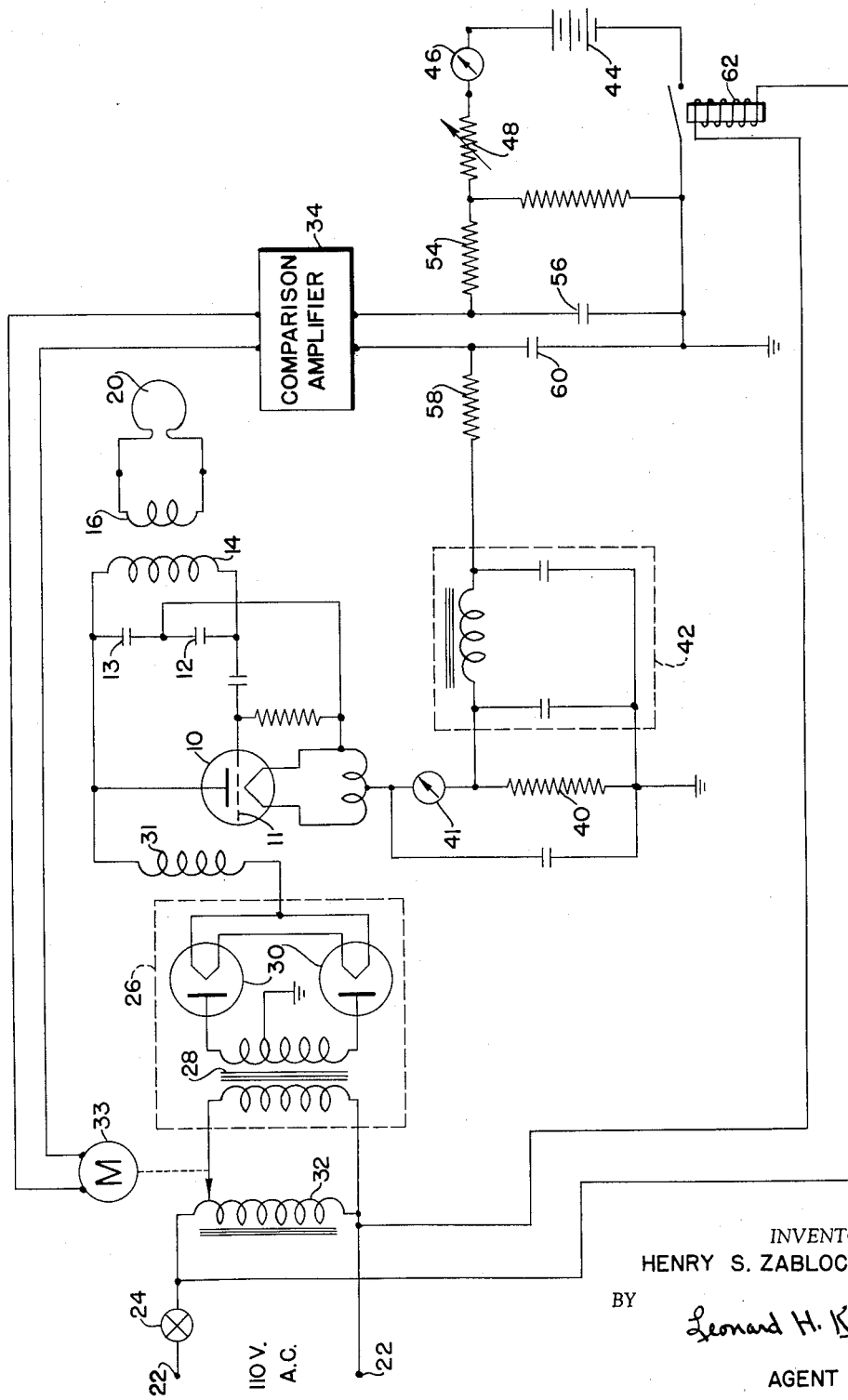
INVENTOR.
HENRY S. ZABLOCKI
BY
Leonard H. King
AGENT

United States Patent Office 2,952,819
Patented Sept. 13, 1960

2,952,819

CONTROL DEVICE FOR INDUCTION HEATING

Henry S. Zablocki, 181 Hillside Ave., Nutley, N.J.

Filed Nov. 30, 1956, Ser. No. 625,449

2 Claims. (Cl. 331—183)

This invention relates to controls for induction heating apparatus and in particular to such controls adapted to maintaining constant temperatures in material being heated by induced electromagnetic currents.

A problem arising in the use of induction heating equipment for the sealing of conductive thermoplastic materials is the variation in the temperature induced in material as a result of fluctuations in supply line voltages.

There is disclosed hereinafter a circuit which controls the plate current of an induction heating apparatus independently of variations in the supply voltage.

It is one object of this invention to provide an improved apparatus for induction heating.

It is another object of this invention to provide an apparatus for controlling the plate current of an induction heating apparatus independently of variations supplied voltage.

Still other objects and advantages of this invention will become apparent from a consideration of the following description taken in conjunction with the accompanying drawing.

In the drawing, there is shown a schematic drawing of the apparatus of this invention. Tube 10 represents the output oscillator stage of an induction heating device. A signal of suitable frequency as practiced in the induction heating art is applied to control grid 11 by means of feed back from a tank circuit consisting of capacitors 12 and 13 and transformer primary winding 14. Transformer secondary 16 couples the output of the heating equipment to coil 20 which is frequently a single turn surrounding the object to be heated. Power to the plate 20 of tube 10 is normally provided by a nominally 110 volt A.C. power source 22. A timer switch 24 is provided for the purpose of providing a convenient means of controlling the length of the heating cycle. A power supply 26 comprising transformer 28 and full wave rectifier 30 provides rectified D.C. voltage of the proper potential to the output tube 10 through filter choke 31.

The foregoing described equipment is conventional in contemporary commercial equipment. In carrying out this invention, there is interposed between voltage source 22 and power supply 26 a means of varying the input voltage. An adjustable autotransformer 32 has been found suitable. The output of the transformer 32, which governs the potential applied to plate 20, is controlled by means of servo motor 33. Servo motor 33 in turn, is under the influence of conventional comparison amplifier 34.

As will be described hereinafter, a signal is applied to the comparison amplifier 34 in accordance with the output current of tube 10 for the purposes of varying the output of the induction transformer so as to maintain the output current constant.

*Control circuit*

A voltage proportional to plate current is developed across a 10 ohm metering resistor 40 in the cathode circuit of tube 10. Meter 41 monitors the magnitude of current. The voltage developed across the resistor is filtered through a pi section L-C filter 42 and compared with the voltage which is proportional to the desired current. The difference voltage is proportional to the difference between the actual plate current and the desired plate current. The comparison circuit consists of a source of D.C. potential which may be supplied by a battery 44 or from a source of rectified and filtered A.C. potential. Meter 46 monitors the current flow. Variable resistor 48 provides means for controlling the current through resistor 50. The voltage developed across resistor 50 is fed to a typical chopper type comparison amplifier 34 through a filter network comprising resistor 54 and capacitor 56. The output of L-C filter 42 is likewise fed to chopper type amplifier 34 through a filter network comprising resistor 58 and capacitor 60. The output voltage of the amplifier is a 60 c.p.s. wave of 0 degree or 180 degree phase depending on the polarity of the error voltage. The output of the amplifier drives one phase of a two phase servo motor 33. The other phase of the motor is driven from a 60 cycle c.p.s. supply voltage which has been shifted 90 degrees by means of a capacitor.

The motor 33 is mechanically connected to the adjustable autotransformer and increases or decreases the plate current until the plate current equals the desired current. This then results in a zero input voltage to the servo comparison amplifier which causes the motor to stop.

In addition to the above described circuit, a disabling relay 62 has been incorporated into the apparatus to open the input circuit of the servo comparison amplifier whenever the induction heating system is not in operation. This is necessary in order to keep the servo system from driving the adjustable autotransformer to the high position when only the standard voltage appears across the input, which condition occurs when the induction heater is off.

What is claimed is:

1. An oscillatory signal generating apparatus of the type employing a vacuum tube provided with a plate and a cathode and a source of electrical energy connected to said plate and cathode having in combination therewith: an adjustable transformer interposed between said source of energy and said plate and cathode so as to provide means for varying the voltage applied between said plate and cathode; motor means arranged to adjust said transformer in response to an error signal; means for detecting variations in the magnitude of the current flowing through said plate and cathode, wherein said detecting means comprises a resistor in series with said plate and cathode; a reference current source and a resistor in series therewith, and a chopper type comparison amplifier arranged to compare the respective voltages generated across said resistors and to produce an error signal proportional to the difference in said currents to operate said motor in a direction tending to adjust said transformer so as to minimize said error signal.

2. An oscillatory signal generating apparatus of the type employing a vacuum tube provided with a plate and a cathode and a source of electrical energy connected to said plate and cathode having in combination therewith: an adjustable transformer interposed between said source of energy and said plate and cathode so as to provide means for varying the voltage applied between said plate and cathode; means for detecting variations in the magnitude of the current flowing through said plate and cathode, and to produce error signals proportional to said variations; motor means, under control of said detecting means, coupled to said adjustable transformer so as to cause said voltage applied to said plate element to vary in response to said error signals in a direction tending to minimize said error signals; and disabling means arranged to disable said motor means whenever said plate and cathode is deenergized.

References Cited in the file of this patent

UNITED STATES PATENTS

| | | |
|---|---|---|
| 2,415,799 | Riefel et al. | Feb. 11, 1947 |
| 2,416,172 | Gregory et al. | Feb. 18, 1947 |
| 2,545,997 | Hagopian | Mar. 20, 1951 |
| 2,691,732 | Boyd et al. | Oct. 12, 1954 |

FOREIGN PATENTS

| | | |
|---|---|---|
| 439,166 | Great Britain | Dec. 2, 1935 |
| 480,348 | Canada | Jan. 15, 1952 |